United States Patent
Christini

(10) Patent No.: US 9,162,723 B2
(45) Date of Patent: Oct. 20, 2015

(54) VEHICLE COVERING AND STORAGE SYSTEM

(71) Applicant: Steven James Christini, Philadelphia, PA (US)

(72) Inventor: Steven James Christini, Philadelphia, PA (US)

(*) Notice: Subject to any disclaimer, the term of this patent is extended or adjusted under 35 U.S.C. 154(b) by 0 days.

(21) Appl. No.: 14/229,046

(22) Filed: Mar. 28, 2014

(65) Prior Publication Data

US 2014/0291365 A1 Oct. 2, 2014

Related U.S. Application Data

(60) Provisional application No. 61/806,296, filed on Mar. 28, 2013.

(51) Int. Cl.
| | |
|---|---|
| *B60R 9/00* | (2006.01) |
| *B62J 11/00* | (2006.01) |
| *B62J 7/08* | (2006.01) |
| *B62J 9/00* | (2006.01) |

(52) U.S. Cl.
CPC .. *B62J 11/00* (2013.01); *B62J 7/08* (2013.01); *B62J 9/003* (2013.01)

(58) Field of Classification Search
CPC ........................................................ B60R 9/00
USPC ............... 224/572, 401, 412, 413, 901.2, 924
See application file for complete search history.

(56) References Cited

U.S. PATENT DOCUMENTS

| 842,498 | A | * | 1/1907 | Schmidt ........................ 24/578.1 |
|---|---|---|---|---|
| 5,044,537 | A | * | 9/1991 | Bufalo ............................ 224/245 |
| 5,288,003 | A | * | 2/1994 | MacDonald .................. 224/328 |
| 5,538,169 | A | * | 7/1996 | Moore .......................... 224/328 |
| 5,704,529 | A | * | 1/1998 | Santoro et al. ................ 224/629 |
| 5,771,305 | A | * | 6/1998 | Davis ............................ 381/386 |
| 6,000,509 | A | * | 12/1999 | Chisholm ..................... 190/109 |
| 6,123,239 | A | * | 9/2000 | Lovitt ........................... 224/413 |
| 6,209,768 | B1 | * | 4/2001 | Boaz ............................. 224/314 |
| 6,244,482 | B1 | * | 6/2001 | Gyarmaty ..................... 224/318 |
| 6,257,470 | B1 | * | 7/2001 | Schaefer ....................... 224/318 |
| 6,533,152 | B1 | * | 3/2003 | Dischler ....................... 224/413 |
| 6,547,114 | B2 | * | 4/2003 | Smith ........................... 224/413 |
| 6,892,912 | B1 | * | 5/2005 | MacNeil ....................... 224/318 |
| 7,047,570 | B2 | * | 5/2006 | Johnson ........................... 2/102 |
| 7,240,404 | B2 | * | 7/2007 | Flossner ......................... 24/3.7 |
| 7,475,799 | B2 | * | 1/2009 | Schaefer ....................... 224/493 |
| 7,490,358 | B1 | * | 2/2009 | Beck ................................ 2/2.5 |
| 7,694,862 | B2 | * | 4/2010 | Bergeron ...................... 224/665 |
| 7,963,427 | B2 | * | 6/2011 | Calkin .......................... 224/675 |
| 8,002,159 | B2 | * | 8/2011 | Cragg ........................... 224/579 |
| 8,011,542 | B2 | * | 9/2011 | Gandy et al. ................. 224/413 |
| 8,814,020 | B2 | * | 8/2014 | Yaeger et al. ................. 224/665 |
| 2007/0175941 | A1 | * | 8/2007 | Berry et al. ................... 224/583 |
| 2009/0282595 | A1 | * | 11/2009 | Branson et al. ................... 2/2.5 |
| 2011/0191933 | A1 | * | 8/2011 | Gregory et al. .................... 2/69 |
| 2013/0240588 | A1 | * | 9/2013 | Milligan et al. .............. 224/580 |

* cited by examiner

*Primary Examiner* — Brian D Nash

(57) ABSTRACT

A vehicle covering and storage system is provided. The vehicle storage system may include a motorized vehicle having an outer surface. The present invention may further include an attachment component. The attachment component includes a fabric panel having a front surface and a back surface. At least one strap is attached to the front surface of the fabric panel. The at least one strap is attached to the fabric panel at a plurality of attachment points along the length of the strap forming a plurality of loops in between the attachment points. The back surface of the fabric panel is attachable to the outer surface of the motorized vehicle.

8 Claims, 4 Drawing Sheets

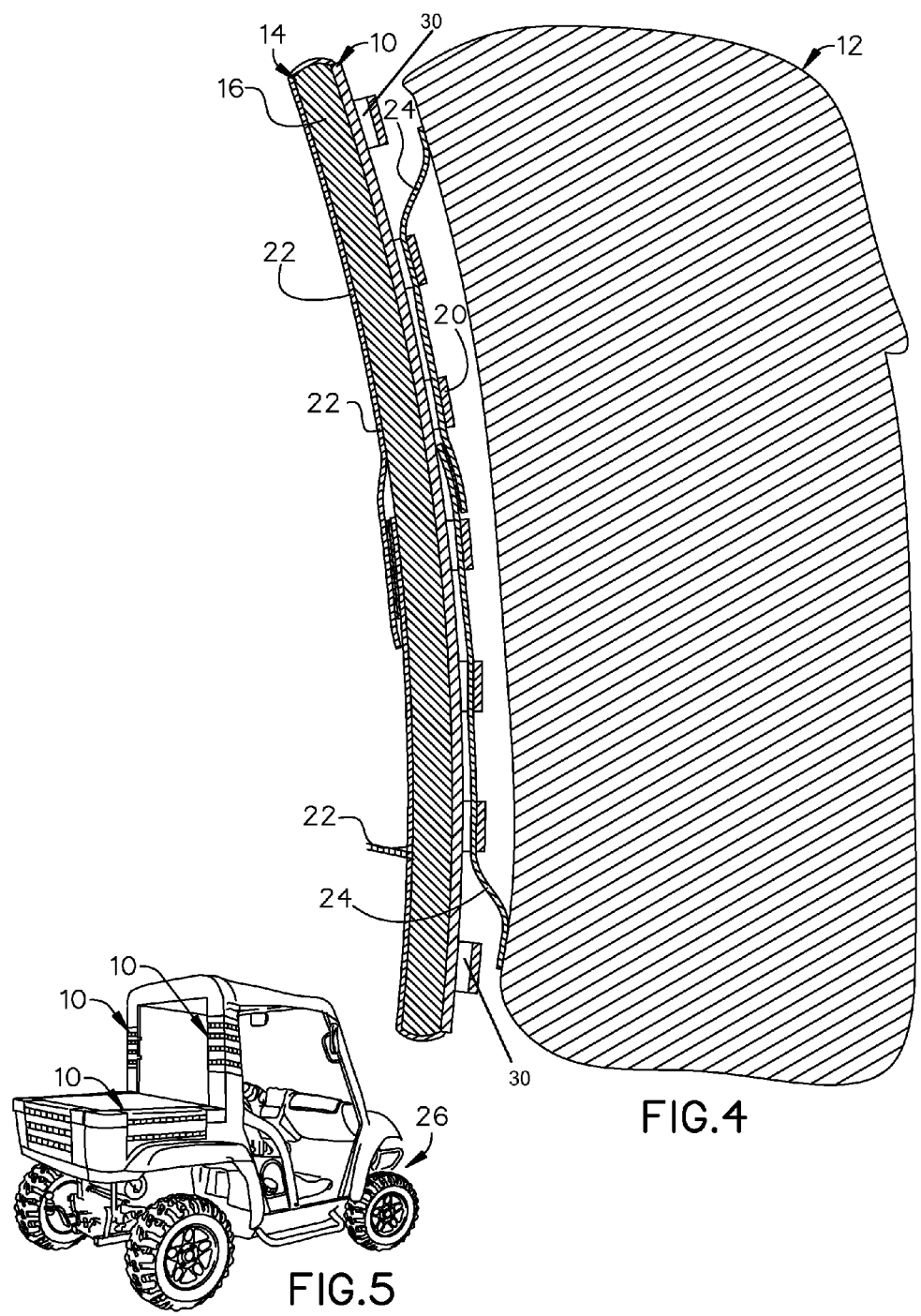

VEHICLE COVERING AND STORAGE SYSTEM

CROSS-REFERENCE TO RELATED APPLICATION

This application claims the benefit of priority of U.S. provisional application No. 61/806,296, filed Mar. 28, 2013, the contents of which are herein incorporated by reference.

BACKGROUND OF THE INVENTION

The present invention relates to a vehicle covering system and, more particularly, to a vehicle covering system for attachment of accessories, such as bags for additional storage space.

Power sports vehicles and other vehicles lack storage space. Many of these vehicles (like a motorcycle, UTV, or ATV) have no space for additional equipment for packaging. Current systems are made to attach permanently and are usually hard cases with limited package size and versatility. These systems have limitations and do not contour and cover the vehicle.

As can be seen, there is a need for an improved system for providing addition storage for the vehicles listed above.

SUMMARY OF THE INVENTION

In one aspect of the present invention, a vehicle covering system comprises: a motorized vehicle comprising an outer surface; an attachment component comprising: a fabric panel comprising a front surface and a back surface; and at least one strap attached to the front surface of the fabric panel, wherein the at least one strap is attached to the fabric panel at a plurality of attachment points along the length of the strap forming a plurality of loops in between the attachment points, wherein the back surface of the fabric panel is attachable to the outer surface of the motorized vehicle.

These and other features, aspects and advantages of the present invention will become better understood with reference to the following drawings, description and claims.

BRIEF DESCRIPTION OF THE DRAWINGS

FIG. 4 is a section detail view of the present invention along line 4-4 in FIG. 1 demonstrating a securement apparatus; and FIG. 5 is a perspective view of an alternate embodiment application of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a vehicle covering system with a functional attachment mechanism made of a fabric or soft covering utilizing attachment loops (i.e. modular lightweight load-carrying equipment, MOLLE) to attach accessories or saddle bags. The soft accessory attachment system utilizing MOLLE is more versatile, flexible and has endless variations of attachments for accessories as well as the ability to be removed easily.

The present invention allows people riding or using the vehicle (or equipment) to easily attach accessories. The fabric contours to the vehicle to make an integrated functional and aesthetically pleasing attachment system. The fabric may also function as an aesthetic modification to the bike giving it color or patterns from the fabric cover. Further, the present invention may include an expandable bag system that is used to increase storage space. This bag system also uses the MOLLE attachment system to secure other accessories.

Figure 1:
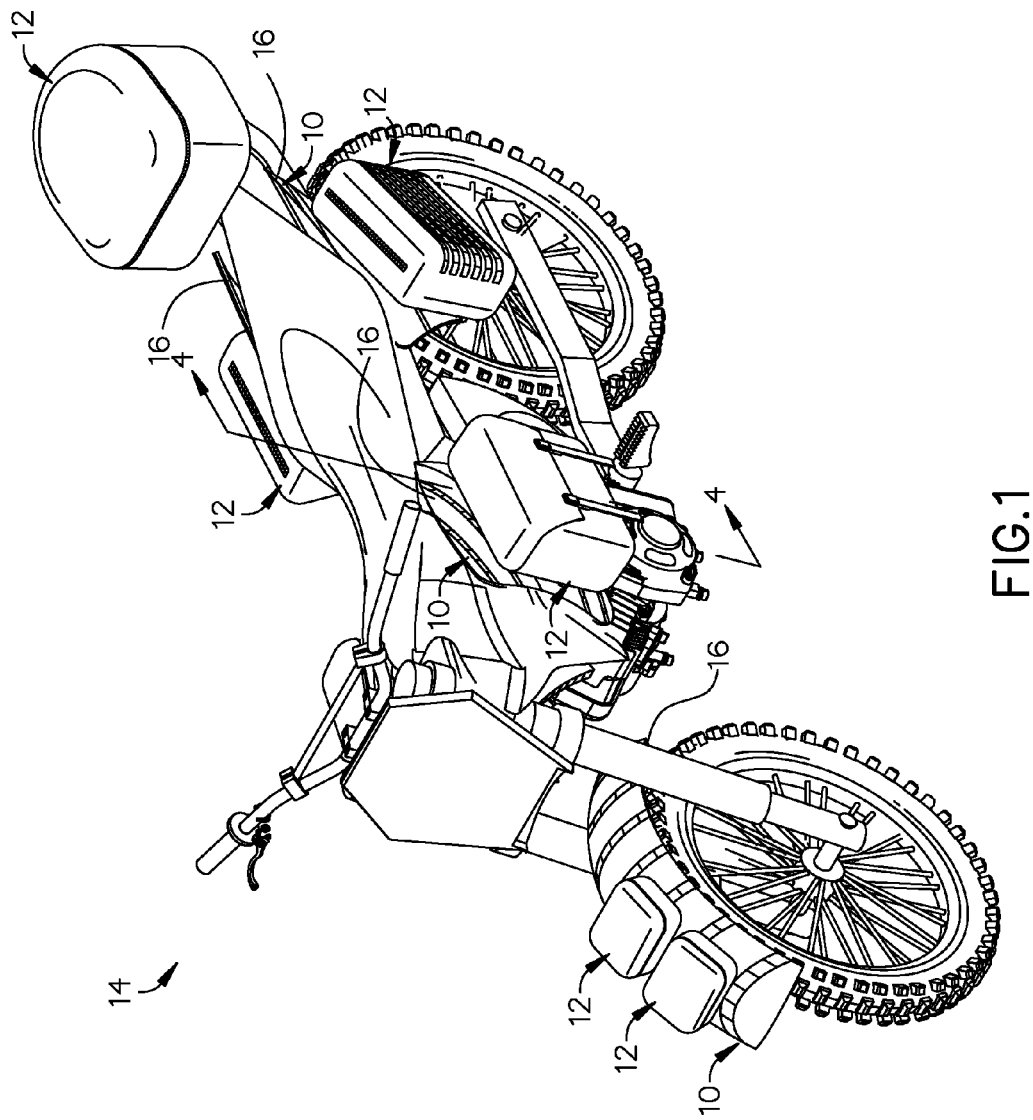
FIG. 1 is a perspective view of the present invention shown in an exemplary configuration.
Figure 2:
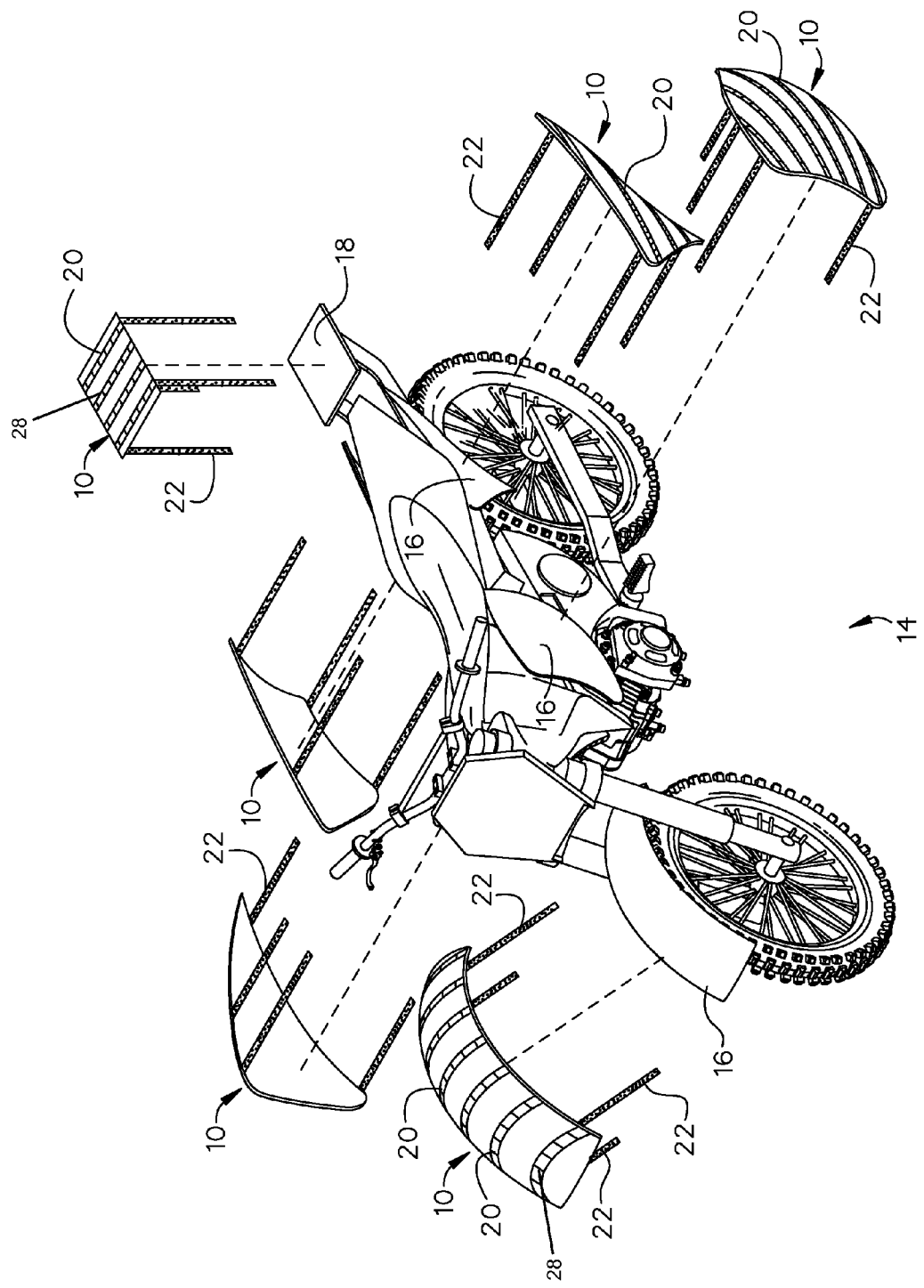
FIG. 2 is an exploded view of the present invention demonstrating application of fabric panels in exemplary configuration.
Figure 3:
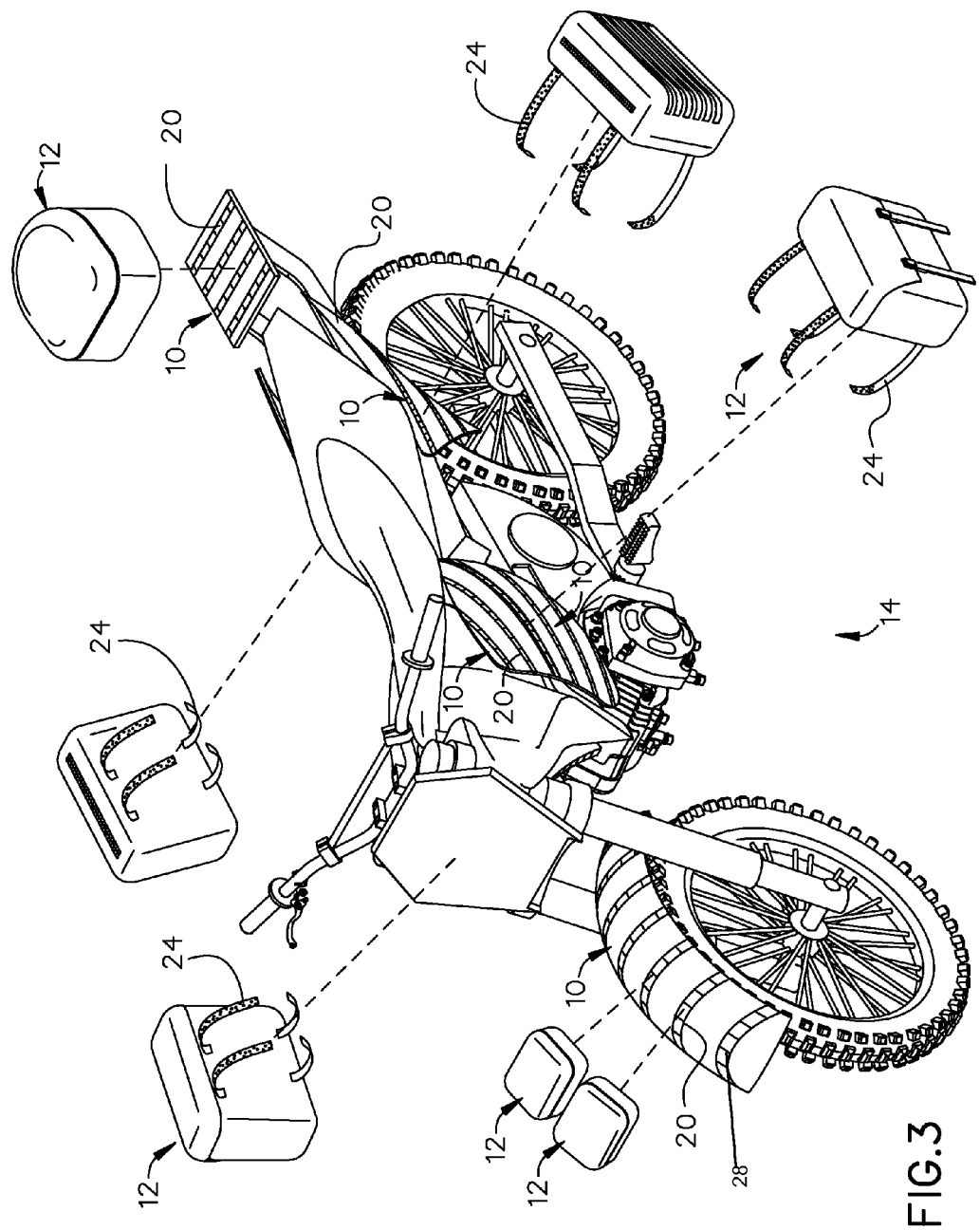
FIG. 3 is an exploded view of the present invention demonstrating application of bag units to the fabric panels of FIG. 2.

Referring to FIGS. 1 through 5, the present invention includes a vehicle storage system. The vehicle storage system may include a motorized vehicle 14 having an outer surface. The present invention may further include an attachment component. The attachment component includes a fabric panel 10 having a front surface and a back surface. At least one strap 20 is attached to the front surface of the fabric panel 10. The at least one strap 20 is attached to the fabric panel 10 at a plurality of attachment points 28 along the length of the strap 20 forming a plurality of loops 30 in between the attachment points 28. The back surface of the fabric panel 10 is attachable to the outer surface of the motorized vehicle 14.

In certain embodiments, the present invention may include a plurality of straps 20. The plurality of straps 20 may be attached to the fabric panel 10 substantially parallel to one another. Each of the plurality of straps 20 may include a plurality of attachment points 28 forming the loops 30 in between. In certain embodiments, the loops 30 of each strap 20 may align the loops 30 of another strap. For example, each loop 30 of a first strap 20 aligns with each loop 30 of a second strap 20.

The fabric panel 10 of the present invention may be either releasably attachable to the outer surface of the vehicle 14 or permanently affixed. As illustrated in the Figures, a plurality of securement bands 22 may extend from the back surface of the fabric panel 10. The plurality of securement bands 22 may include a fastener, such as a hook and loop fastener, clips, buttons and the like. The securement bands 22 may be wrapped around the panels 16 of the motorized vehicle 14 and may be secured to one another to secure the fabric panel 10 to the outer surface of the vehicle 14. The securing straps 22 may also be permanently fixed to the vehicle using hard mounting fasteners such as clips or bolts.

In certain embodiments, the motorized vehicle 14 of the present invention may include at least one of a motorcycle, an all terrain vehicle (ATV), a utility terrain vehicle 26 (UTV) and a manned and unmanned military vehicle. When the motorized vehicle 14 is a motorcycle, the outer surface of the vehicle 14 may include panels 16 and a motorcycle rack 18. The fabric panel 10 may be releasably attachable or permanently affixed to the motorcycle's panels 16 and rack 18.

Different accessories and storage devices may be attached to the motorized vehicle 14 utilizing the loops 30 of the present invention. For example, the present invention may include at least one storage bag 12. The storage bags 12 may be releasably attachable to the straps 20 via the plurality of loops 30. In certain embodiments, bag straps 24 may extend from the bags 12. The bag straps 24 may be inserted through the loops 30 and connect together. Therefore, the bag 12 may be connected to the motorized vehicle 14.

The fabric panel of the present invention may include a fabric or soft material which can contour to the vehicle. The attachment component, i.e. the MOLLE attachment system, allows the accessories to mount to the vehicle. The fabric coverings are utilized to cover the vehicle with the MOLLE loop system. The loop system allows for any number of accessories to be attached to the vehicle.

A method of making the present invention may include the following. The system may be sewn, glued, stitched or bonded together in a pattern that will be useful for the vehicle in which it is designed. The system could also be of different colors to match the esthetics of the vehicle. Any person with a vehicle like an ATV or motorcycle may apply the system to the outside of their vehicle to allow them to attach more accessories, tools, or equipment. The benefit of this system allows for endless versatility with the multitude of MOLLE loops enabling the position of accessories in any position.

It should be understood, of course, that the foregoing relates to exemplary embodiments of the invention and that modifications may be made without departing from the spirit and scope of the invention as set forth in the following claims.

What is claimed is:

1. A vehicle covering system comprising:
a motorized vehicle comprising an outer surface;
an attachment component comprising:
a fabric panel comprising a front surface and a back surface opposite the front surface; and
at least one strap attached to the front surface of the fabric panel, wherein the at least one strap is attached to the fabric panel at a plurality of attachment points along the length of the strap forming a plurality of loops in between the attachment points,
wherein the fabric panel is attached to the outer surface of the motorized vehicle contouring a shape of the outer surface, wherein the back surface is secured against and adjacent to the outer surface of the motorized vehicle and the front surface is facing away from the outer surface of the motorized vehicle.

2. The vehicle storage system of claim 1, wherein the at least one strap is a plurality of straps substantially parallel to one another, wherein each loop of a first strap aligns with each loop of a second strap.

3. The vehicle storage system of claim 1, further comprising a plurality of securement bands extending from the back surface of the fabric panel releasably attaching the attachment component to the outer surface of the motorized vehicle.

4. The vehicle storage system of claim 3, wherein the securement bands comprise a hook and loop fastener.

5. The vehicle storage system of claim 1, further comprising at least one of an attachable accessory and a storage bag releasably attachable to the at least one strap via the plurality of loops.

6. The vehicle storage system of claim 1, wherein the motorized vehicle comprises at least one of a motorcycle, an all terrain vehicle, utility terrain vehicle (UTV), and a manned and unmanned military vehicle.

7. The vehicle storage system of claim 1, wherein the motorized vehicle is a motorcycle.

8. The vehicle storage system of claim 1, wherein the outer surface comprises at least one of a motorcycle panel and a motorcycle rack.

* * * * *